US008549947B2

(12) United States Patent
Iwase et al.

(10) Patent No.: US 8,549,947 B2
(45) Date of Patent: Oct. 8, 2013

(54) BALL SPEED REDUCER AND ROTARY TABLE DEVICE USING THE SAME

(75) Inventors: Yoshio Iwase, Saitama-ken (JP); Masahiro Machida, Saitama-ken (JP); Yoshihiro Machida, Saitama-ken (JP)

(73) Assignees: Meko Seiki Inc., Saitama-Shi, Saitama-Ken (JP); Tsudakoma Kogyo Kabushiki Kaisha, Kanazawa-Shi, Ishikawa-Ken (JP)

( * ) Notice: Subject to any disclaimer, the term of this patent is extended or adjusted under 35 U.S.C. 154(b) by 478 days.

(21) Appl. No.: 12/920,646

(22) PCT Filed: Feb. 17, 2009

(86) PCT No.: PCT/JP2009/052628
§ 371 (c)(1), (2), (4) Date: Sep. 2, 2010

(87) PCT Pub. No.: WO2009/110309
PCT Pub. Date: Sep. 11, 2009

(65) Prior Publication Data
US 2011/0000331 A1    Jan. 6, 2011

(30) Foreign Application Priority Data

Mar. 3, 2008 (JP) ................................. 2008-052725

(51) Int. Cl.
*F16H 1/06* (2006.01)
*F16H 1/20* (2006.01)

(52) U.S. Cl.
USPC .......................................... 74/415; 74/424.81

(58) Field of Classification Search
USPC ....................................... 74/425, 424.81, 415
See application file for complete search history.

(56) References Cited

U.S. PATENT DOCUMENTS

| 1,893,362 A | * | 1/1933 | Given et al. | 74/411 |
| 2,950,627 A | * | 8/1960 | Bonnafe | 74/396 |
| 4,648,286 A | * | 3/1987 | Nemoto | 74/425 |

(Continued)

FOREIGN PATENT DOCUMENTS

| JP | 58-211052 A | 12/1983 |
| JP | 189641/1985 U | 12/1985 |

(Continued)

OTHER PUBLICATIONS

International Search Report mailed on Apr. 28, 2009 for corresponding International Publication No. WO 2009/110309.

(Continued)

*Primary Examiner* — Justin Krause
(74) *Attorney, Agent, or Firm* — Yoshida & Associates, LLC

(57) ABSTRACT

Provided are a ball-type speed reducer and a rotary table device that are capable of performing high-speed rotation and high-rigidity rotation and suitable for reduction in size and weight. An index table 10 includes a ball-type speed reducer 20 and a table 50 that is fixed to an upper surface of a worm wheel 30 of the ball-type speed reducer 20. When the worm gear 22 rotates as the input shaft 24 of the ball-type speed reducer 20 rotates, balls 36 made of a magnetic material move along a ball groove 26 having a spiral shape. The worm wheel 30 rotates as the balls 36 move, and the table 50 rotates. The balls 36 are attracted and held by the permanent magnet 34 on the worm wheel 30 side, so that a case for preventing the balls 36 from coming off the worm wheel 30 can be omitted, whereby the total size and weight can be reduced. Backlash is not required, so that high-speed rotation and high-rigidity rotation are possible.

8 Claims, 2 Drawing Sheets

(56) References Cited

U.S. PATENT DOCUMENTS

| | | | |
|---|---|---|---|
| 5,090,266 A * | 2/1992 | Otsuka | 74/425 |
| 7,051,610 B2 * | 5/2006 | Stoianovici et al. | 74/425 |
| 2006/0156845 A1 | 7/2006 | Tong | |

FOREIGN PATENT DOCUMENTS

| | | |
|---|---|---|
| JP | 177948/1987 U | 11/1987 |
| JP | 63-139640 A | 6/1988 |
| JP | 05-302649 A | 11/1993 |
| JP | 2002-205244 A | 7/2002 |

OTHER PUBLICATIONS

European Search Report mailed on May 2, 2011 for corresponding EP Application No. 09717848.7.

* cited by examiner (A)

(B)

BALL SPEED REDUCER AND ROTARY TABLE DEVICE USING THE SAME

TECHNICAL FIELD

The present invention relates to a ball-type speed reducer and a rotary table device using the same. In particular, the present invention relates to making a ball-type speed reducer be fast, compact, and lightweight.

BACKGROUND ART

Existing worm speed reducers, such as a speed reducing mechanism for a printer described in Patent Document 1, include a worm, which is fixed to an output shaft of a motor, and a worm wheel that meshes with the worm. In such a worm speed reducer, backlash is required. Patent Document 2 describes a technology for reducing the backlash of a worm speed reducer. According to the technology described in Patent Document 2, the speed of input rotation is reduced in the speed reducer by a worm gear fixed to an input shaft and a worm wheel fixed to an output shaft. The worm gear is hourglass-shaped and has a spiral ball groove formed therein, and the ball groove meshes with balls that are disposed in multiple recesses formed in the periphery of the worm wheel, whereby the rotational power of the worm gear is transmitted to the worm wheel.

[Patent Document 1] Japanese Unexamined Utility Model Registration Application Publication No. 5-16329
[Patent Document 2] Japanese Unexamined Patent Application Publication No. 5-302649

DISCLOSURE OF INVENTION

Problems to be Solved by the Invention

However, the existing technologies have the following problems. First, with the worm speed reducer described in Patent Document 1, high-speed rotation and high-rigidity rotation are difficult to achieve because backlash is required, and a rotary table device with high-precision cannot be provided by using the worm speed reducer. Second, with the technology described in Patent Document 2, the balls, which are disposed in the recesses in the periphery of the worm wheel, are held by a case. That is, the case prevents the balls from coming off the worm wheel. Therefore, a problem exists in that the speed reducer is large and heavy.

In view of the above, an object of the present invention is to provide a ball-type speed reducer that allows high-speed and high-rigidity rotation and is suitable for reduction in size and weight. Another object of the present invention is to provide a high-precision rotary table using the ball-type speed reducer.

Means for Solving the Problems

To achieve the objects, a ball-type speed reducer according to the present invention includes a worm wheel including a plurality of recesses formed in an outer peripheral surface thereof; magnets that are contained in the recesses; spherical bodies made of a magnetic material, the spherical bodies being partially contained in the recesses, and the spherical bodies being attracted and held by the magnets; and a worm gear including a spiral groove formed in an outer peripheral surface thereof, the spiral groove receiving surfaces of the spherical bodies, and the worm gear being rotationally driven by driving means.

In an embodiment, the worm wheel of the ball-type speed reducer is made of a magnetic material. In another embodiment, the spherical body is a rigid sphere. In still another embodiment, the worm gear is hourglass-shaped.

A rotary table device according to the present invention includes any one of the speed reducers described above and a table fixed to the worm wheel of the speed reducer. The aforementioned object and other objects, the characteristics, and the advantages of the present invention will become clear from the following description and the attached drawings.

Advantages

According to the present invention, the spherical bodies made of a magnetic material are attracted and held by the magnets contained in the recesses formed in the outer peripheral surface of the worm wheel, and the rotation of the worm gear is transmitted by the spherical bodies. Therefore, backlash is eliminated (or reduced), so that high-speed rotation and high-rigidity rotation are achieved. Moreover, a case for holding the spherical bodies can be omitted, so that the ball-type speed reducer can be made compact and lightweight. By using the ball-type speed reducer, a high-precision rotary table device can be provided.

REFERENCE NUMERALS

Figure 1:
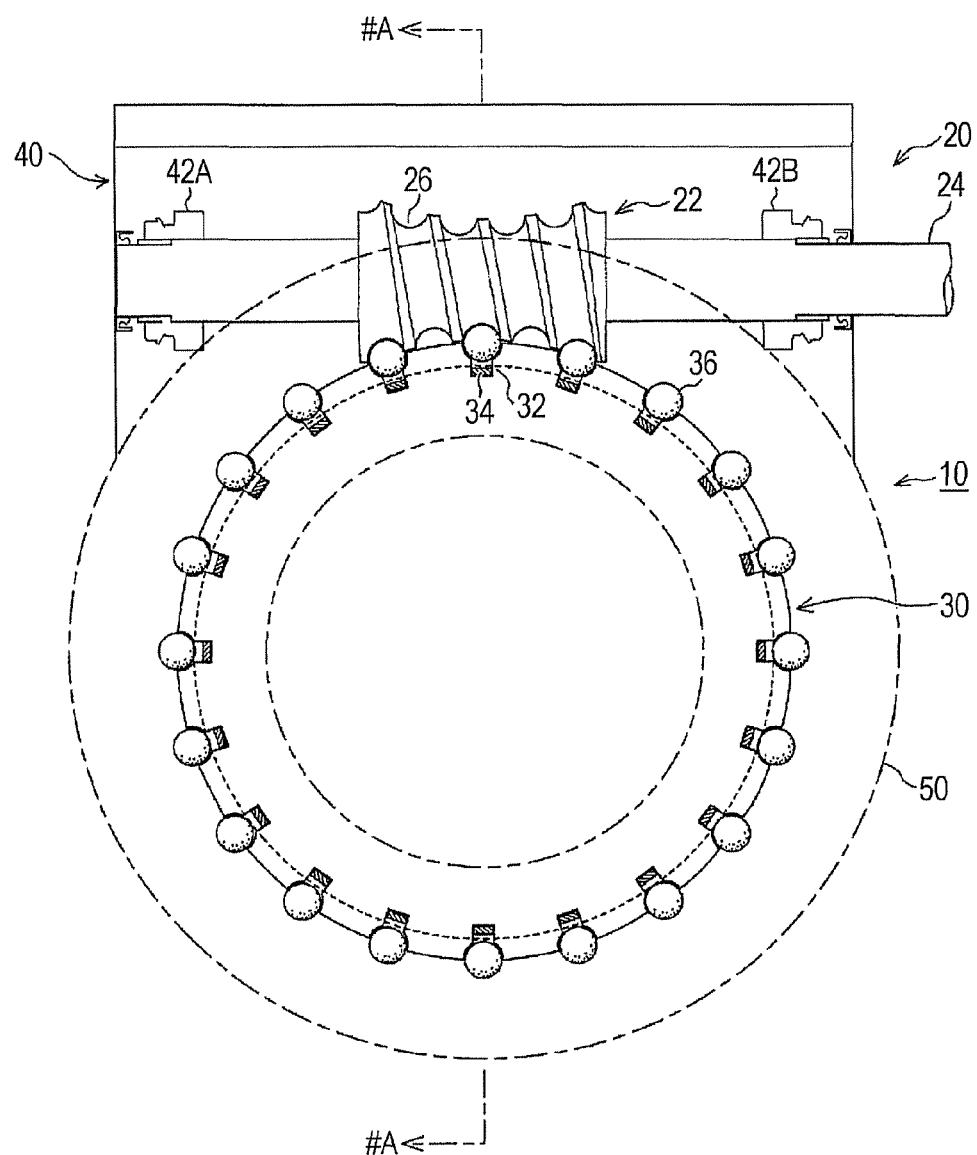
FIG. 1 is a plan view of an index table according to an embodiment of the present invention.

10 index table (rotary table device)
20 ball-type speed reducer
22 worm gear
24 input shaft
26 ball groove
30 worm wheel
32 recess
32A container section
32B spherical section
34 permanent magnet
36 ball
38 space
40 case
42A, 42B, 44, 46 bearing
50 table

BEST MODE FOR CARRYING OUT THE INVENTION

Hereinafter, a best mode for carrying out the present invention will be described in detail on the basis of an embodiment.

First Embodiment

Figure 2:
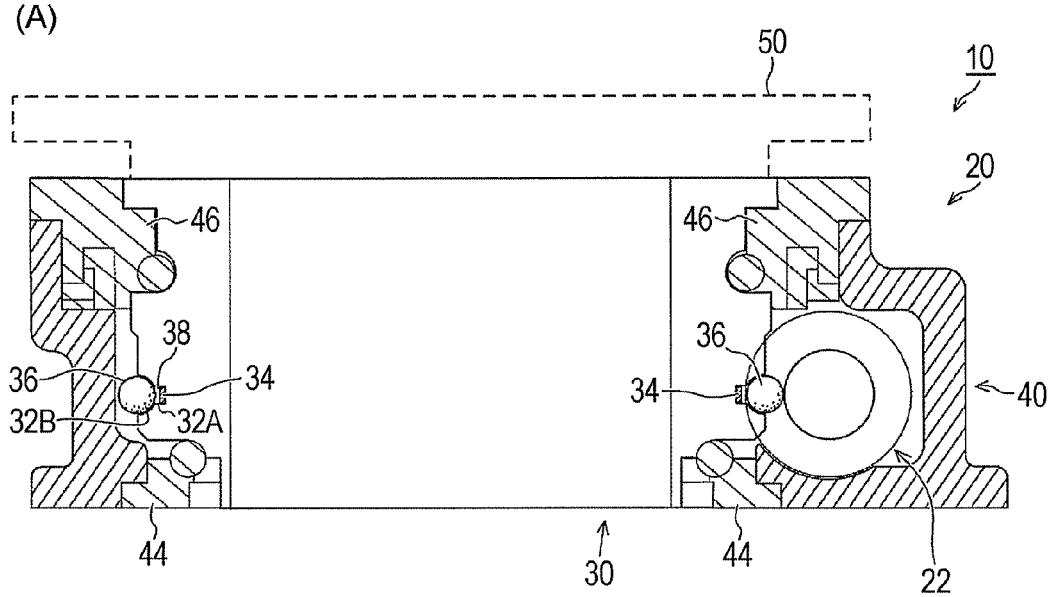
FIG. 2(A) is a sectional view of FIG. 1 taken along line #A-#A and viewed in the direction of the arrows.
FIG. 2(B) is a view illustrating the state of magnetic flux.
Figure 2:
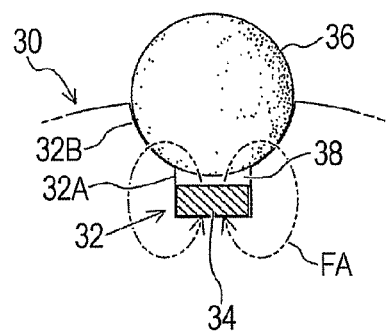

First, referring to FIGS. 1 and 2, a first embodiment of the present invention will be described. The present embodiment is a rotary table device, such as an index table, to which a ball-type speed reducer according to the present invention is applied. The term "index table" will be used throughout the present embodiment, although the index table may be called a turntable, a rotary table, a circular table, or a turntable. FIG. 1 is a plan view of the index table according to the present embodiment. FIG. 2(A) is a sectional view taken along line #A-#A of FIG. 1 and viewed in the direction of the arrows, and FIG. 2(B) is a view illustrating the state of magnetic flux.

As illustrated in FIG. 1, an index table 10 according to the present embodiment includes a ball-type speed reducer 20 and a table 50. The ball-type speed reducer 20 includes a worm gear 22 and a worm wheel 30. The worm gear 22 is fixed to an input shaft 24. The input shaft 24 is rotatably supported in a case 40 at appropriate positions by a pair of bearings 42A and 42B. A ball groove 26 having a spiral shape is formed in the outer periphery of the worm gear 22. In the present embodiment, the worm gear 22 is a hourglass-shaped worm gear, which has a larger diameter at the end portions than at the middle portion. The worm gear 22 is in contact with balls 36 over a large area.

A large number of recesses 32 are formed in the outer periphery of the worm wheel 30. As illustrated in FIG. 2(B), each of the recesses 32 includes a container section 32A for containing a permanent magnet 34 and a spherical section 32B for receiving one of the balls 36. The permanent magnet 34 is contained in the container section 32A of the recess 32. In the present embodiment, the worm wheel 30 is made of a magnetic substance or a magnetic material. Therefore, the permanent magnet 34 is attached to the worm wheel 30 with a magnetic force. The ball 36 is partially contained in the spherical section 32B of the recess 32. The ball 36 is also made of a magnetic substance and attracted by the permanent magnet 34. The dimensions of the elements are determined so that a space 38 is provided between the permanent magnet 34 and the ball 36. The space 38 prevents the permanent magnet 34 from being damaged due to the rotation of the ball 36. The space 38 also functions as an oil sump.

As illustrated in FIG. 2(B) with an arrow FA (or the arrow opposite thereto), magnetic field lines emanate from the permanent magnet 34, pass through the ball 36 and the worm wheel 30, and return to the permanent magnet 34. Thus, the ball 36 is held in the recess 32 in the worm wheel 30 by the permanent magnet 34, and the ball 36 is fitted into and meshes with the ball groove 26 in the worm gear 22. As illustrated in FIG. 2(A), the worm wheel 30 is rotatably supported in the case 40 by bearings 44 and 46. The table 50 is fixed to the upper surface of the worm wheel 30 using appropriate means. The table 50 may be directly fixed to or formed on the upper surface of the worm wheel 30. However, a table having a different structure may be used. For example, the table 50 may be used as a sub-table and a main table (not shown) may be attached thereto.

Next, the operation of the present embodiment will be described. A driving mechanism (not shown) rotates the input shaft 24, the worm gear 22 rotates as the input shaft 24 rotates, and the balls 36 move along the ball groove 26. Due to the movement of the balls 36, the worm wheel 30 rotates, and the table 50 rotates. Thus, the rotation of the input shaft 24 is transmitted to the table 50. The number of rotation of the worm wheel 30 is smaller than the number of rotation of the input shaft 24, so that the function as the speed reducer 20 is realized. These movements are similar to those of existing technologies described above.

Thus, the first embodiment has the following advantages.
(1) The balls 36 are attracted by the permanent magnet 34 toward the worm wheel 30, so that means for preventing the balls 36 from coming off the worm wheel 30 can be omitted. Therefore, the size and weight of the device can be reduced.
(2) Backlash is not required, so that the speed reducer 20 can perform high-speed rotation and high-rigidity rotation.
(3) The magnetic force of the permanent magnet 34 forms a closed loop that passes through the worm wheel 30 and the ball 36 and the magnetic field lines does not leak to the outside. Therefore, even if iron powder or the like is suspended in lubricating oil, the iron powder or the like does not adhere to the worm wheel 30 or the balls 36.
(4) The worm wheel 30 is made of a magnetic material, so that the permanent magnet 34 can be easily fixed with a magnetic force.
(5) The worm gear 22 is hourglass-shaped, so that the worm gear 22 meshes with the balls 36 over a large area and the rotation of the input shaft 24 can be reliably transmitted to the worm wheel 30.
(6) The table 50 is fixed to the worm wheel 30 of the speed reducer 20, so that the index table 50 with a high precision is provided.

The present invention is not limited to the embodiment described above, and can be modified in various ways within the spirit and the scope of the present invention. For example, the embodiment can be modified as follows.
(1) The shapes, dimensions, and materials described in the embodiment are examples, and may be appropriately modified as long as the same operation can be performed.
(3) Urging means for applying pressing forces to the balls 36 may be provided to the worm wheel 30 so that backlash can be reduced further.
(4) In the embodiment, the ball-type speed reducer according to the present invention is applied to the index table.
This is an example, and the ball-type speed reducer may be used in any existing mechanical devices.

INDUSTRIAL APPLICABILITY

According to the present invention, the spherical bodies made of a magnetic material are attracted and held by the magnets contained in the recesses formed in the outer peripheral surface of the worm wheel, and the rotation of the worm gear is transmitted by the spherical bodies. Therefore, backlash is eliminated (or reduced), so that high-speed rotation and high-rigidity rotation are achieved. Moreover, a case for holding the spherical bodies can be omitted, so that the ball-type speed reducer can be made compact and lightweight. Therefore, the present invention is applicable to a ball-type speed reducer. In particular, the present invention is suitable for use in a rotary table device, such as an index table.

The invention claimed is:
1. A ball speed reducer (20) comprising:
a worm wheel (30) including a plurality of recesses (32) formed in an outer peripheral surface thereof;
magnets (34) that are contained in the recesses (32);
balls (36) made of a magnetic material, the balls (36) being partially contained in the recesses (32), and the balls (36) being attracted and held by the magnets (34); and
a worm gear (22) including a spiral groove (26) formed in an outer peripheral surface thereof, the spiral groove (26) receiving surfaces of the balls (36), and the worm gear (22) being rotationally driven by driving means,
wherein each of the recesses (32) includes a container section (32A) for containing a corresponding one of the magnets (34) and a spherical section (32B) for receiving a corresponding one of the balls (36), and
wherein each of the recesses (32) is configured so that a space (38) is formed between a corresponding one of the magnets (34) and a corresponding one of the balls (36) when the magnet (34) is contained in the container section (32A) and the ball (36) is received in the spherical section (32B).

2. A rotary table device (10) comprising the speed reducer (20) according to claim 1, and a table (50) that is fixed to the worm wheel (30) of the speed reducer (20).

3. The ball speed reducer (20) according to claim 1, wherein the worm wheel (30) is made of a magnetic material.

4. The ball speed reducer (20) according to claim 3, wherein the balls (36) are rigid spheres.

5. The ball speed reducer (20) according to claim 3, wherein the worm gear (22) is hourglass-shaped.

6. A rotary table device (10) comprising the speed reducer (20) according to claim 3, and a table (50) that is fixed to the worm wheel (30) of the speed reducer (20).

7. The ball speed reducer (20) according to claim 1, wherein the worm gear (22) is hourglass-shaped.

8. A rotary table device (10) comprising the speed reducer (20) according to claim 7, and a table (50) that is fixed to the worm wheel (30) of the speed reducer (20).

\* \* \* \* \*